Patented Oct. 20, 1936

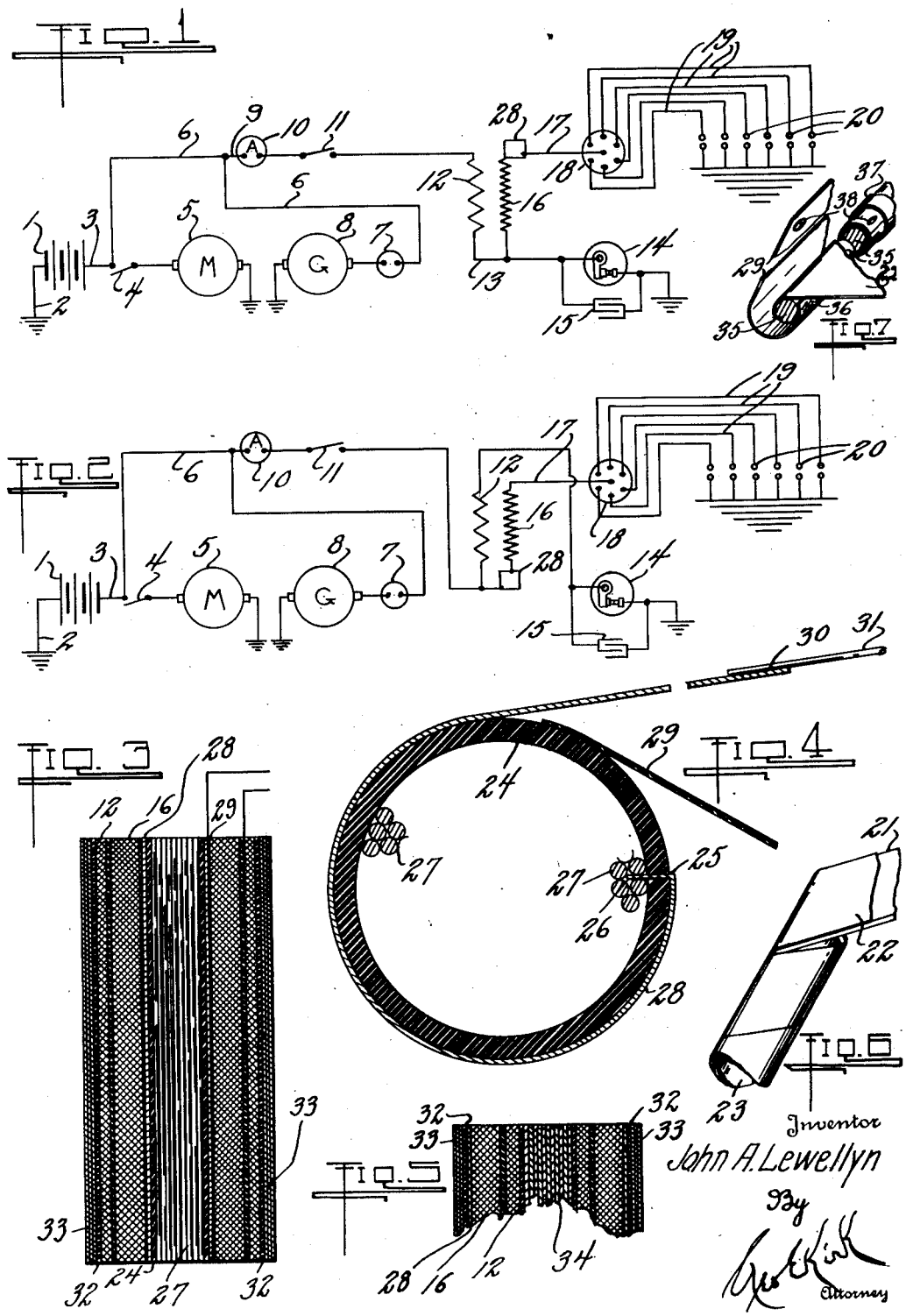

2,058,088

UNITED STATES PATENT OFFICE 2,058,088

HIGH TENSION ELECTRICAL COIL

John A. Lewellyn, Port Huron, Mich., assignor of one-fourth to Geo. E. Kirk, Toledo, Ohio Application July 18, 1934, Serial No. 735,778

4 Claims. (Cl. 175—356)

This invention relates to electric current carrying windings or coils.

This invention has utility when incorporated in windings, especially as primary and secondary different potential windings in ignition coils.

Referring to the drawing:

Fig. 1 is an embodiment of the invention in a wiring layout as in motor vehicle operation;

Fig. 2 is an additional wiring diagram as adapted to motor vehicle operation;

Fig. 3 is a longitudinal section through a coil hereunder;

Fig. 4 is a fragmentary detail of features of assembly for the coil of Fig. 3;

Fig. 5 is a modification of the coil of Fig. 3;

Fig. 6 is a detail of tube formation for the terminal in a coil of the type of Fig. 3; and Fig. 7 is an additional tube detail of manufacture.

Secondary battery 1, shown having ground 2, line 3 therefrom, may have circuit closed by switch 4 to starting motor 5. This line 3 may have line 6 to control connection 7 for receiving charging current for the battery from generator 8. Branch 9 from the line 6 extends to ammeter 10 having switch 11 which may connect in primary 12 having line 13 therefrom to breaker 14 and condenser 15. In association with this primary 12 is high tension secondary coil 16 having line 17 therefrom to distributor 18, having lines 19 therefrom to spark plugs 20.

In production, the coils are wound on a dielectric tube. This tube may be molded, pressed or wound. If the latter, the tube may have ply 21 of a suitable dielectric such as paper and a strip ply 22 of an electric conductor such as metal foil; for instance, tinned copper or aluminum, helically assembled with the paper to form a helically wound tube 23. This tube 23 as so wound will have a more or less extended exposure of the conductor ply which forms a terminal 22, to have one end thereof beyond the ply 21 on the interior of the tube 23 and a portion thereof beyond the ply 21 on the exterior. Instead of using a spirally wound tube, a molded or pressed tube 24 of insulation material may be adopted. This may also be paper or other suitable dielectric material, and in this instance, a port or slot 25 may be provided longitudinally therethrough. Through this slot there may extend one terminal 26 of the foil 22 to contact wires 27 forming an iron core axially of this tube 24, there being a portion of the strip 22 on the tube exterior.

This foil 22 forms a thin sheet terminal 28 on the tube exterior in a thin and relatively extended area. In this latter construction the external wrapping of the foil about the tube 24 may be inter-wound with a ply of dielectric such as glassine or suitable insulation paper. From this at least full wrap sheet terminal 28, there may be anchor or solder connection 30 with secondary winding wire 31 of the coil 16, say an enameled, varnished, or other insulated fine wire, which in the instance of ignition wire for current motor vehicle practice, may be as small as No. 38, and the windings run up to 400 turns per layer, and there may be as many as fifty layers in this close or solid winding with which the similar-center cylindrical-form wrapping of foil is directly connected. Between each two layers a ply of dielectric is introduced. This foil may be .001 inch thick and given, say approximately one and one-half wraps about the tube. The paper or dielectric may be .0015. In practice, this terminal for the secondary winding is for the layer of the secondary away from the primary winding. The inner end mentioned in the claims is that portion of the foil at the connection 30 and accordingly away from the terminal 25. Therefore, this inner end is the connecting end to the wire regardless of which way wound and is the portion which is away from the lead extending from the coil secondary.

Accordingly, in the instance that the primary winding 12 be about or outside the secondary winding 16 as in Fig. 3, the sheet terminal 28 anchored with the winding 16 is directly about the tube 24 and is connected to the core 27 through the slot 25. In the event primary winding 12 be adjacent the tube 24 (Fig. 5) the thin sheet terminal 28 is on the outer side of the coil, and accordingly just inside coil wrapping 32. In practice, this coil wrapping 32 is enclosed by arc sections or plates 33 of sheet iron shield in general control of the magnetic field. In lieu of multiple wire core 27 as an alternative construction or modification there may be laminated core 34 for the coil.

In practice, this leaf or thin sheet terminal of the foil is a material factor in contributing to the holding up properties and life of the coil even under a wide range of adverse operating conditions. There is such an extent for the conducting of the electric current that such does not tend to localize at the connection 30, for it may more readily spread into the thin sheet terminal. As so dispersed, there is reduced tendency to attack the dielectric in the region thereof. There is reduced energy loss, especially from heating, and accordingly, not only electrical efficiency but life for the coil is increased, for there is minimized any hazard from chemical reaction setting in due to heating, and thereby avoiding deterioration from such source.

The accomplishment hereunder is thus of mechanical, electrical, and chemical value as well as of manufacturing simplicity and efficiency.

The advantage as to keeping down heating seems to be attained by the ready action of the foil in conducting the heat out of the coil or rendering the heat more uniform in the coil instead of local.

The tube may be built upon arbor 35, say of metal. In this practice, the dielectric paper 29 may have outer gummed face 36. The foil 22, preferably somewhat in excess of one wrap but may be for additional wraps in extent, is engaged with or adjacent the arbor 35, with the gummed paper 29, 36, inserted thereunder, short of reaching the inner end of the foil 22. This paper, say of craft stock .005 inch in thickness, is of slightly greater width than the foil. The gummed surface 36 may be moistened and the foil and paper wrapped simultaneously about the arbor 35. It is desirable that the paper be of an extent beyond the foil. The assembly may be anchored in tubular form by adhesive or gummed tape 37. As so assembled, port 38 in the gummed paper may expose a region of the foil 22 for the electrical conductor connection or solder 30 with wire 31. While the tube length as thus formed may be for a single coil, in these instances the paper overlaps the foil slightly at each end. In the instance the tube be for multiple coil length, the tube, after forming, may be cut into the desired length sections.

What is claimed and it is desired to secure by Letters Patent is:

1. A high tension electric coil comprising a primary winding and a secondary winding, the secondary winding formed of two portions connected in series, the first portion constituting a fine wire winding of which one end forms a winding terminal and the other end is connected to the inner end of the second portion, the second portion constituting a foil wrapping for said first portion and having its outer end form the other winding terminal.

2. A high tension electric coil comprising a primary winding and a secondary winding, the secondary winding being formed of two portions connected in series, there being a wire forming one portion thereof, of which one end forms a winding terminal and the other end has connection to the inner end of the second portion thereof, said second portion consisting of thin sheet electrical conductor material to form a coil wrapping as to the first of said portions, there being an additional winding terminal for the secondary winding to which the other end of said wrapping extends, said additional terminal being spaced from the connection between the first and second portions by at least one full turn of the wrapping.

3. A high tension electric coil comprising a primary winding and a secondary winding, the secondary winding being formed of two portions connected in series, there being a wire forming one portion thereof, of which one end forms a winding terminal and the other end has connection to the inner end of the second portion thereof, said second portion consisting of thin sheet electrical conductor material to form a coil wrapping as to the first of said portions, there being an additional winding terminal for the secondary winding to which the other end of said wrapping extends, said additional terminal being spaced from the connection between the first and second portions by at least one full turn of the wrapping, and insulation spacing said wrapping and wire.

4. A high tension electric coil comprising a primary winding and a secondary winding, the secondary winding being formed of two portions connected in series, there being a wire forming one portion thereof, of which one end forms a winding terminal and the other end has connection to the inner end of the second portion thereof, said second portion consisting of thin sheet electrical conductor material to form a coil wrapping as to the first of said portions, there being an additional winding terminal for the secondary winding to which the other end of said wrapping extends, said additional terminal being spaced from the connection between the first and second portions by at least one full turn of the wrapping, said coil windings being of concentric cylindrical form.

JOHN A. LEWELLYN.